(12) United States Patent
Konno et al.

(10) Patent No.: US 10,968,989 B2
(45) Date of Patent: Apr. 6, 2021

(54) CHAIN GUIDE

(71) Applicant: TSUBAKIMOTO CHAIN CO., Osaka (JP)

(72) Inventors: Masahiko Konno, Osaka (JP); Munehiro Maeda, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 474 days.

(21) Appl. No.: 15/995,620

(22) Filed: Jun. 1, 2018

(65) Prior Publication Data

US 2018/0347672 A1 Dec. 6, 2018

(30) Foreign Application Priority Data

Jun. 5, 2017 (JP) .............................. JP2017-110748

(51) Int. Cl.
*F16H 7/18* (2006.01)
*F16H 7/08* (2006.01)

(52) U.S. Cl.
CPC ................. *F16H 7/18* (2013.01); *F16H 7/08* (2013.01); *F16H 2007/0872* (2013.01); *F16H 2007/185* (2013.01)

(58) Field of Classification Search
CPC ...... F16H 7/18; F16H 7/08; F16H 2007/0872; F16H 2007/185
See application file for complete search history.

(56) References Cited

U.S. PATENT DOCUMENTS 5,286,234 A * 2/1994 Young ...................... F16H 7/08
474/111
6,322,471 B1 11/2001 Hashimoto
(Continued)

FOREIGN PATENT DOCUMENTS

| JP | 2000-257679 A | 9/2000 |
|---|---|---|
| JP | 2001-108031 A | 4/2001 |

(Continued)

OTHER PUBLICATIONS

Office Action dated Feb. 26, 2020, issued in counterpart KR application No. 10-2018-0059695, with English translation. (11 pages).

*Primary Examiner* — Michael R Mansen
*Assistant Examiner* — Robert T Reese
(74) *Attorney, Agent, or Firm* — Westerman, Hattori, Daniels & Adrian, LLP

(57) ABSTRACT

An object of the present invention is to provide a chain guide, which allows easy assembling of a guide shoe to a base member, and reliably prevents detachment of the guide shoe from the base member resulting from vibration or the like during the running of a chain. Provided is a chain guide wherein a base member includes an attachment extension extending upward from a base body part beyond a support surface, and a base-side engaged part formed in the attachment extension, a guide shoe includes a flexible extension extending from a shoe body part, and a shoe-side engaging part formed in the flexible extension, and the shoe-side engaging part is hooked to the base-side engaged part from below, or diagonally from below, or from front or back, to be positioned on the far side of the base-side engaged part during engagement therebetween.

4 Claims, 15 Drawing Sheets

(56) References Cited

U.S. PATENT DOCUMENTS

| | | | |
|---|---|---|---|
| 2009/0239692 A1* | 9/2009 | Heinrich | F16H 7/08 474/111 |
| 2013/0210566 A1* | 8/2013 | Konno | F16H 7/18 474/111 |
| 2014/0349796 A1* | 11/2014 | Takagi | F16H 7/18 474/140 |
| 2017/0009849 A1* | 1/2017 | Stiglmaier | F16H 7/06 |

FOREIGN PATENT DOCUMENTS

| | | |
|---|---|---|
| JP | 2010-209939 A | 9/2010 |
| JP | 5004984 B2 | 8/2012 |

* cited by examiner

Related Art

Related Art

CHAIN GUIDE

BACKGROUND OF THE INVENTION

1. Field of the Invention

The present invention relates to a chain guide, which includes a guide shoe having a guide surface for slidably guiding a chain along a front to back direction, and a base member having a support surface for supporting the guide shoe and an attachment extension for attaching the chain guide to an attachment target, the guide shoe being mounted to the base member by being slid on the base member from the near side to the far side.

2. Description of the Related Art

A chain guide incorporated in a timing system in the engine room of a car and slidably guiding a chain running between sprockets to keep an appropriate chain tension has hitherto been known (see, for example, Japanese Patent Application Laid-open No. 2001-108031).

One type of such chain guide 110 that has been developed includes, as shown in FIG. 14 and FIG. 15 for reference, a guide shoe 120 having a guide surface 131 for slidably guiding a chain along a front to back direction, and a base member 170 having a support surface 181 for supporting the guide shoe 120 and an attachment extension 190 for attaching the chain guide 110 to an attachment target. The guide shoe 120 is mounted to the base member 170 by being slid on the base member 170 from the near side to the far side.

In this chain guide 110, the guide shoe 120 is easily restricted from moving relative to the base member 170 in the vertical direction, front to back direction, and toward the far side, by engagement between a front-side engaging portion 150 and a rear-side engaging portion 160 and a base body part 180. On the other hand, restricting the movement of the guide shoe 120 toward the near side relative to the base member 170 requires creativity. In the chain guide 110 shown in FIG. 14 and FIG. 15, a shoe-side engaging part 141 in the form of a protrusion on the lower surface of the shoe body part 130 is engaged with an engaging hole 196 in the upper surface of the base body part 180 to restrict the movement of the guide shoe 120 toward the near side relative to the base member 170.

SUMMARY OF THE INVENTION

Since the shoe-side engaging part 141 is formed on the lower surface of the shoe body part 130 in the chain guide 110 shown in FIG. 14 and FIG. 15, when attaching the guide shoe 120 to the base member 170, the shoe body part 130 must be bent backward as the guide shoe 120 is slid on the base member 170 to the far side to make the shoe-side engaging part 141 engage with the engaging hole 196.

The shoe body part 130 requires strength and wear resistance because of its function of slidably guiding the chain and needs to have more than a certain thickness. Therefore, the shoe body part 130 hardly allows itself to be bent backward appropriately as the guide shoe 120 is slid toward the far side. There is thus a possibility of assembling failure because of the shoe-side engaging part 141 being not completely engaged with the engaging hole 196. Applying a large force in an attempt to engage the shoe-side engaging part 141 with the engaging hole 196 could lead to chipping of the shoe-side engaging part 141.

To facilitate the engagement between the shoe-side engaging part 141 and the engaging hole 196, the shoe-side engaging part 141 could be designed shorter. This, however, would allow the shoe-side engaging part 141 to come off of the engaging hole 196 more easily and there was a possibility that the guide shoe 120 could be detached from of the base member 170 when the guide shoe 120 lifts up from the base member 170 resulting from vibration or the like during the running of the chain. The problem of detachment of the guide shoe 120 would rise easily particularly when the chain guide 110 is installed between cam shafts, since the guide shoe 120 would readily lift up due to the chordal action of the chain caused by the short distance between the cam shafts.

Another problem is that the operation of sliding the guide shoe 120 on the base member 170 to the far side while bending the shoe body part 130 backward to make the shoe-side engaging part 141 engage with the engaging hole 196 as described above requires fine adjustment of the force and is hardly suited to machine automated assembly, as a result of which the production cost is increased.

Yet another problem is that once the shoe-side engaging part 141 is engaged with the engaging hole 196, they are firmly engaged with each other, so that it is hard to separate the guide shoe 120 from the base member 170 when, for example, the chain guide 110 is disassembled for material segregation and discarded.

The present invention solves these problems, its object being to provide a chain guide, which allows easy assembling of the guide shoe to the base member, and reliably prevents detachment of the guide shoe from the base member resulting from vibration or the like during the running of the chain, with a simple structure.

The present invention solves the problems described above by providing a chain guide including: a guide shoe having a guide surface for slidably guiding a chain along a front to back direction; and a base member having a support surface for supporting the guide shoe, and an attachment extension for attaching the chain guide to an attachment target, the guide shoe being mounted to the base member by being slid on the base member from a near side to a far side. The base member includes a base body part having the support surface, the attachment extension extending upward from the base body part beyond the support surface, and a base-side engaged part formed in the attachment extension. The guide shoe includes a shoe body part having the guide surface, a flexible extension extending from the shoe body part, and a shoe-side engaging part formed in the flexible extension and capable of engaging with the base-side engaged part. The shoe-side engaging part is hooked to the base-side engaged part from below, or diagonally from below, or from front or back, to be positioned on a far side of the base-side engaged part during engagement therebetween.

According to one aspect of the present invention, the shoe-side engaging part capable of engaging with the base-side engaged part is formed in the flexible extension extending from the shoe body part, so that, when the guide shoe is mounted to the base member by being slid on the base member to the far side, the flexible extension, instead of the shoe body part, is bent to allow the shoe-side engaging part to engage with the base-side engaged part. This way, the assembling of the guide shoe to the base member can be readily achieved while avoiding assembly failures and possible chipping of the shoe-side engaging part.

The shoe-side engaging part is configured to be hooked to the base-side engaged part from below, or diagonally from below, or from front or back so that it is positioned on the far side of the base-side engaged part. Even when the guide shoe lifts up due to vibration or the like during the running of the chain, the shoe-side engaging part and the base-side engaged part are prevented from loosened or detached from each other, and thus detachment of the guide shoe is prevented.

Since the shoe-side engaging part can be engaged with the base-side engaged part without bending the shoe body part, the assembling process does not require fine adjustment of the force and can readily be fit for machine automated assembly.

According to another aspect of the present invention, the flexible extension extends upward from a far-side edge of the shoe body part, and the attachment extension extends upward from a far-side edge of the base body part, so that an increase in size in the width direction of the guide shoe and base member can be avoided. Moreover, since the flexible extension has flexibility and is movable toward the near side and far side, when the guide shoe tries to move toward the near side or far side of the base member, the flexible extension bends toward the near side or far side so that it can disperse the load it receives, and thus breakage of the flexible extension can be prevented.

According to another aspect of the present invention, a near-side base extension is formed with an engaging hole that extends through in a vertical direction. The shoe-side engaging part is inserted in the engaging hole, and a near-side edge portion of the engaging hole functions as the base-side engaged part. When the shoe-side engaging part is to be disengaged from the base-side engaged part, the shoe-side engaging part can be accessed from above the engaging hole, or the flexible extension may be bent, whereby the shoe-side engaging part can easily be removed from the base-side engaged part, and thus the shoe-side engaging part and base-side engaged part can readily be separated from each other. The guide shoe is restricted from moving also in the front to back direction relative to the base member, since the shoe-side engaging part is inserted in the engaging hole.

According to another aspect of the present invention, the attachment extension includes an upward base extension extending upward from the far-side edge of the base body part, and the base-side engaged part is formed in the upward base extension. Since there is no need to form the base-side engaged part at the distal end side of the upward base extension, the degree of freedom in designing the shape and the like of the attachment extension at the distal end side of the upward base extension can be increased.

According to another aspect of the present invention, the flexible extension is inserted in the engaging hole, so that, even when the guide shoe is lifted up due to vibration or the like during the running of the chain, the upward movement of the guide shoe relative to the base member is restricted, and detachment of the guide shoe is reliably prevented. Moreover, since the flexible extension has flexibility and is movable in the vertical direction, when the guide shoe is lifted up as mentioned above, the flexible extension bends in the vertical direction so that it can disperse the load it receives, and thus breakage of the flexible extension can be prevented. When the shoe-side engaging part is to be disengaged from the base-side engaged part, the flexible extension can be accessed from the far side of the engaging hole, or the flexible extension may be bent, whereby the shoe-side engaging part can easily be removed from the base-side engaged part, and thus the shoe-side engaging part and base-side engaged part can readily be separated from each other.

According to another aspect of the present invention, each flexible extension engages with a front-side edge or rear side edge of the engaging hole, so that the movement of the guide shoe in the front to back direction relative to the base member can be restricted. Moreover, since the flexible extension has flexibility and is movable in the front to back direction, when the guide shoe tries to move back and forth relative to the base member, the flexible extension bends in the front to back direction so that it can disperse the load it receives, and thus breakage of the flexible extension can be prevented. Also, since the flexible extension is inserted in the engaging hole, even when the guide shoe is lifted up due to vibration or the like during the running of the chain, the upward movement of the guide shoe relative to the base member is restricted. When the shoe-side engaging part is to be disengaged from the base-side engaged part, the flexible extension can be accessed from the far side of the engaging hole, or the flexible extension may be bent, whereby the shoe-side engaging part can easily be removed from the base-side engaged part, and thus the shoe-side engaging part and base-side engaged part can readily be separated from each other.

According to another aspect of the present invention, the engaging hole for the flexible extension to engage with need not be formed in the upward base extension, so that high-strength and compact design of the attachment extension is possible. Each flexible extension can be positioned on the front side or back side of the upward base extension, so that the movement of the guide shoe in the front to back direction relative to the base member can be restricted. Moreover, since the flexible extension has flexibility and is movable in the front to back direction, when the guide shoe tries to move back and forth relative to the base member, the flexible extension bends in the front to back direction so that it can disperse the load it receives, and thus breakage of the flexible extension can be prevented. When the shoe-side engaging part is to be disengaged from the base-side engaged part, the flexible extension can be accessed from front or back, or the flexible extension may be bent, whereby the shoe-side engaging part can easily be removed from the base-side engaged part, and thus the shoe-side engaging part and base-side engaged part can readily be separated from each other.

According to another aspect of the present invention, the guide shoe includes a front-side engaging portion formed on a front side of the flexible extension and engaging with the base member, and a rear-side engaging portion formed on a rear side of the flexible extension and engaging with the base member. The front-side engaging portion and rear-side engaging portion are configured to engage with the base member by sliding of the guide shoe on the base member from the near side to the far side. Thus the movement of the guide shoe in the front to back direction, and toward the near side and far side relative to the base member, can be reliably restricted, while ensuring assemblability of the guide shoe to the base member.

DESCRIPTION OF THE PREFERRED EMBODIMENTS

A chain guide 10 according to a first embodiment of the present invention will be hereinafter described with reference to the drawings.

The chain guide 10 according to the first embodiment of the present invention is incorporated in a timing system installed in an engine room when in use, and slidably guides a chain running between a plurality of sprockets provided respectively to a crankshaft and cam shafts to keep an appropriate chain tension.

Figure 1:
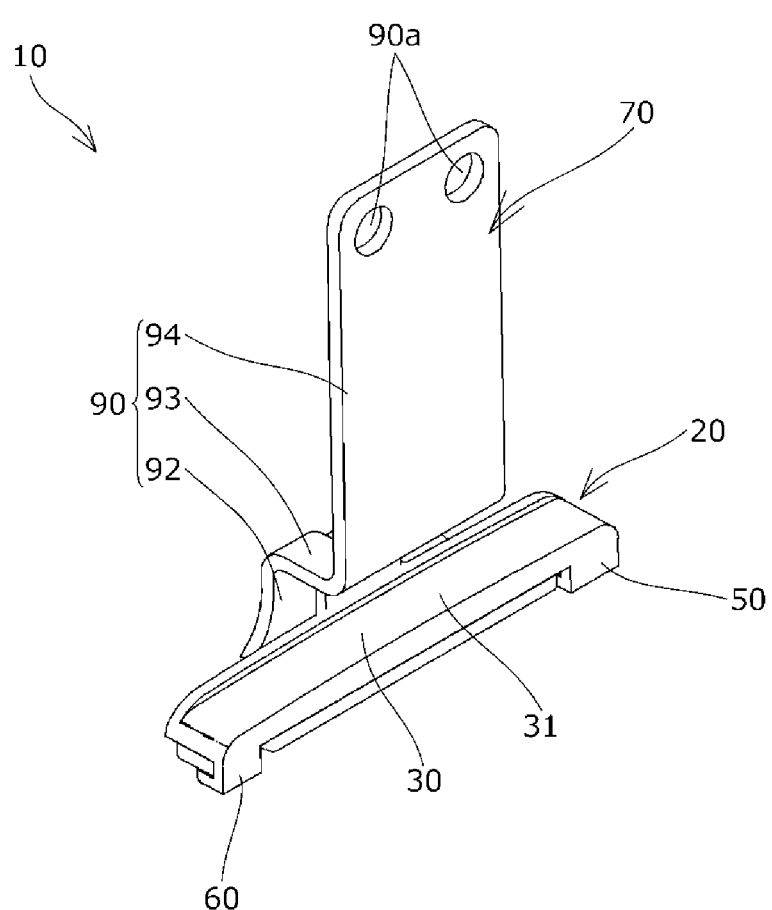
FIG. 1 is a perspective view illustrating a chain guide of a first embodiment.
Figure 2:
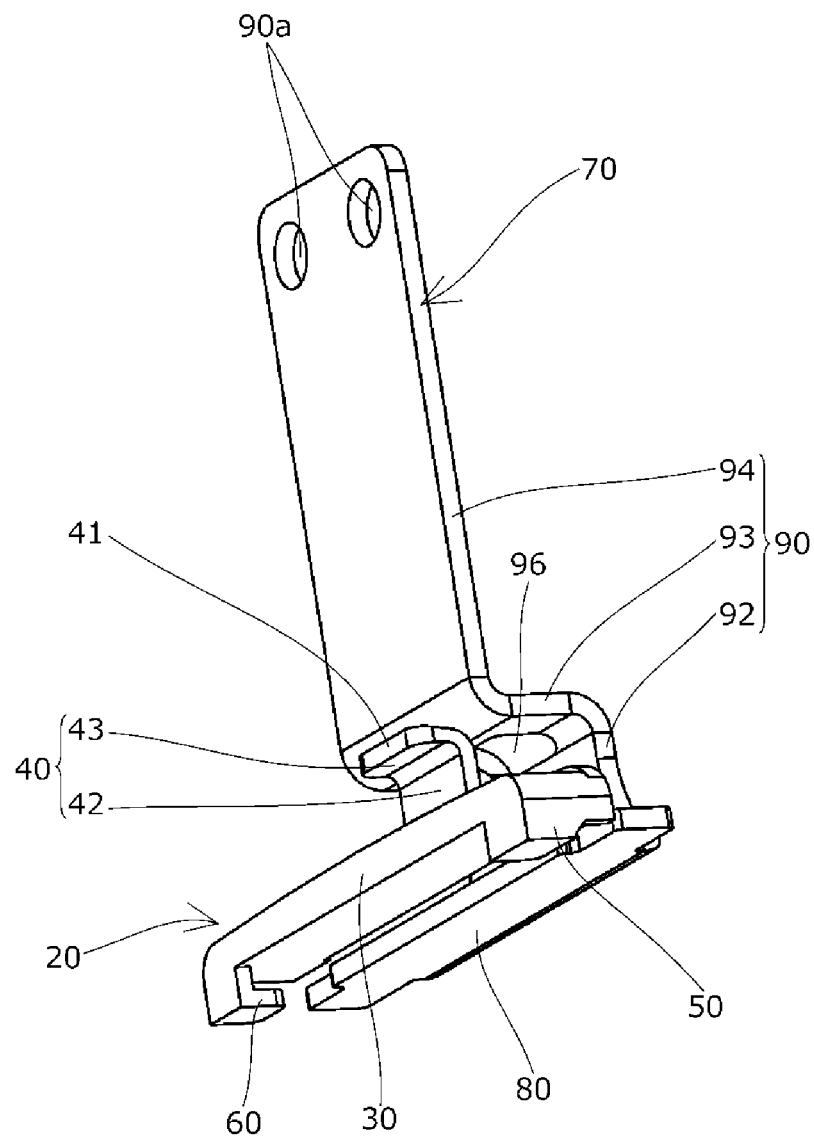
FIG. 2 is a perspective view illustrating the chain guide of the first embodiment in a state during assembly.
Figure 3:
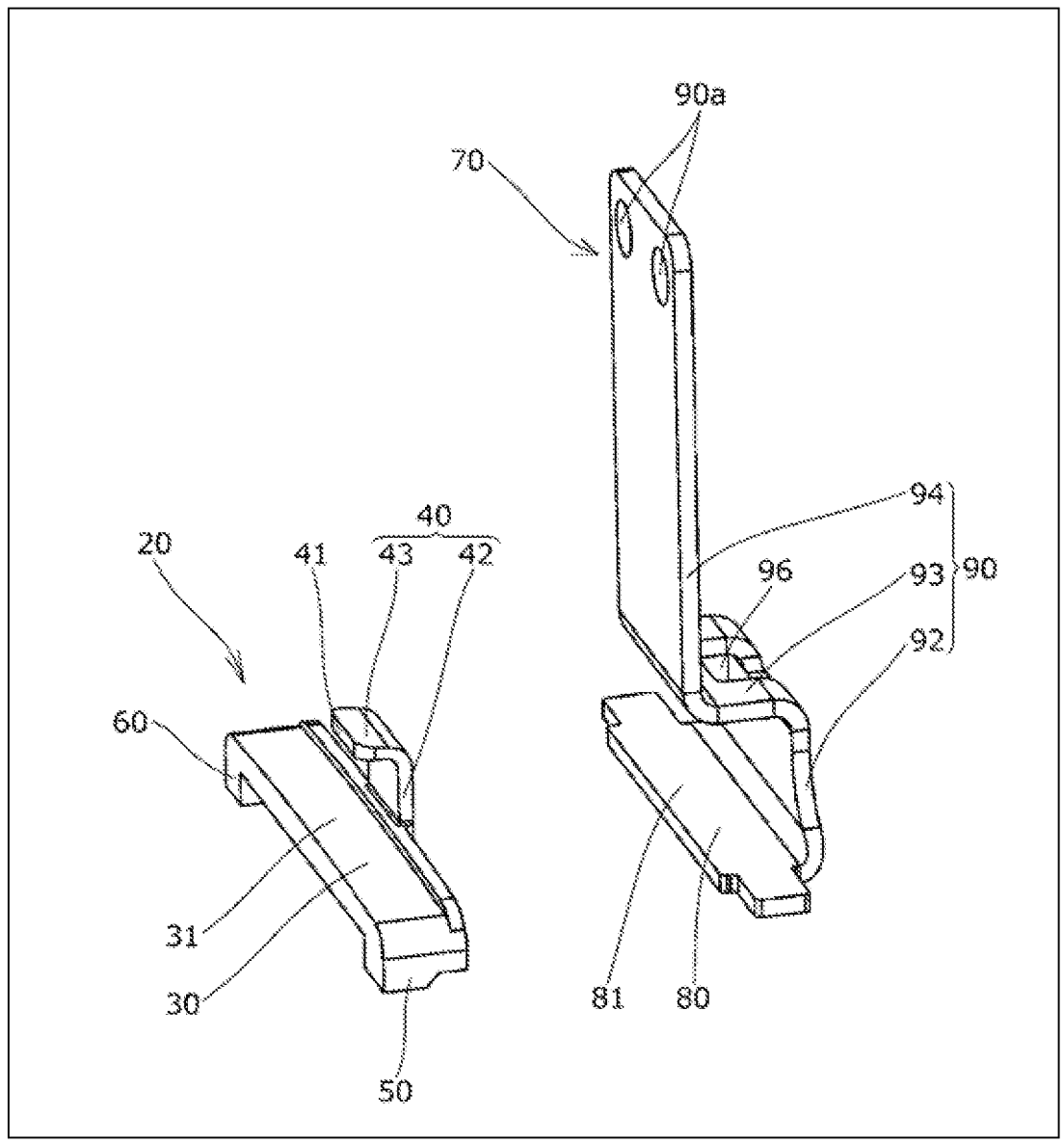
FIG. 3 is a perspective view illustrating the chain guide of the first embodiment before assembly.

The chain guide 10 is configured as a fixed guide fixedly installed inside the engine room. As shown in FIG. 1 to FIG. 3, the chain guide is made up of a guide shoe 20 having a guide surface (upper surface) 31 for slidably guiding a chain along a front to back direction (chain running direction, or guide longitudinal direction), and a base member 70 that supports the guide shoe 20.

The guide shoe 20 is removably attached to the base member 70 by being slid on the base member 70 from the near side to the far side in the width direction, as can be seen from FIG. 1 to FIG. 3.

As shown in FIG. 1 to FIG. 3, the guide shoe 20 includes a shoe body part 30 having the guide surface 31, a flexible extension 40 extending upward from an edge on the far side in the width direction of the shoe body part 30 beyond the guide surface 31 at or near the center in the front to back direction, a shoe-side engaging part 41 formed in the flexible extension 40, a front-side engaging portion 50 formed at a front end of the shoe body part 30, and a rear-side engaging portion 60 formed at a rear end of the shoe body part 30.

The flexible extension 40 is formed in a plate-like shape and includes an upward shoe extension 42 extending upward from a far-side edge of the shoe body part 30, and a near-side shoe extension 43 extending toward the near side from an upper edge of the upward shoe extension 42, as shown in FIG. 1 to FIG. 4.

Figure 4:
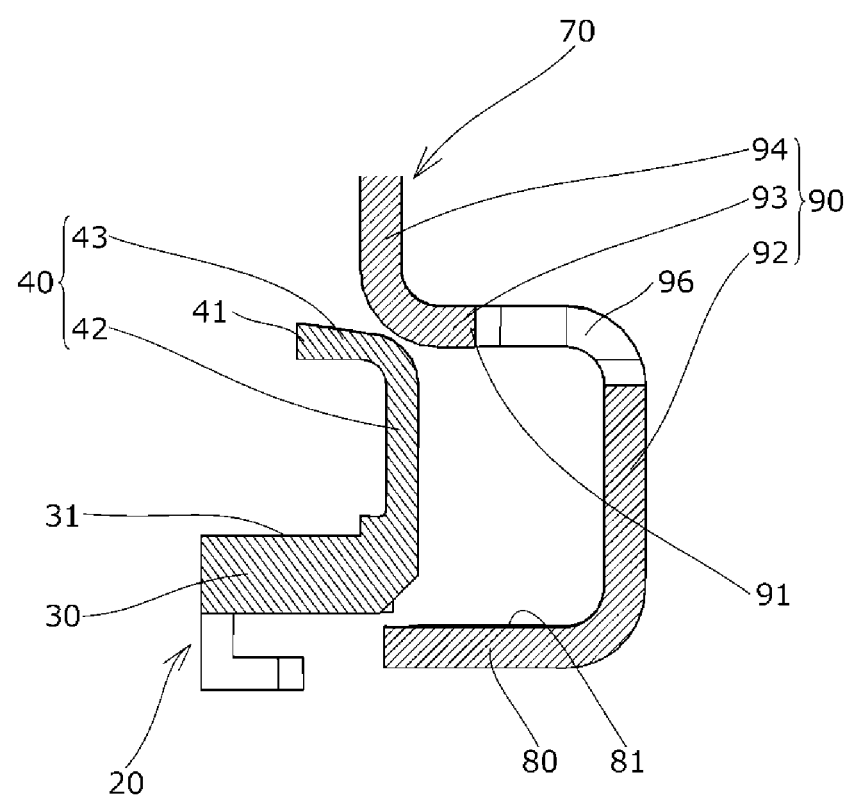
FIG. 4 is a cross-sectional view illustrating the chain guide of the first embodiment in a state during assembly.

The flexible extension 40 has a thickness smaller than the dimension in the front to back direction of the flexible extension 40, and smaller than the thickness in the vertical direction of the shoe body part 30 as shown in FIG. 4.

Thus the flexible extension 40 has flexibility, so that the upward shoe extension 42 can move toward the near side and far side, and the near-side shoe extension 43 can move in the vertical direction.

The front-side engaging portion 50 is formed in the shape of a hook and configured to be able to engage with a front end of the base body part 80 as shown in FIG. 1 to FIG. 3. The movement of the guide shoe 20 relative to the base member 70 in the vertical direction, to the back side, and to the far side is restricted by the engagement between the front-side engaging portion 50 and the base body part 80.

The rear-side engaging portion 60 is formed in the shape of a hook and configured to be able to engage with a rear end of the base body part 80 as shown in FIG. 1 to FIG. 3. The movement of the guide shoe 20 relative to the base member 70 in the vertical direction, to the front side, and to the far side is restricted by the engagement between the rear-side engaging portion 60 and the base body part 80.

The base member 70 includes, as shown in FIG. 1 to FIG. 3, the base body part 80 having a support surface (upper surface) 81 for supporting the guide shoe 20, an attachment extension 90 extending upward from an edge on the far side in the width direction of the base body part 80 beyond the support surface 81, and a base-side engaged part 91 formed in the attachment extension 90.

The attachment extension 90 is provided for attaching the chain guide 10 to an attachment target such as an engine block, and includes, as shown in FIG. 1 to FIG. 4, a first upward base extension 92 extending upward from a far-side edge of the base body part 80, a near-side base extension 93 extending from an upper end of the first upward base extension 92 toward the near side, and a second upward base extension 94 extending upward from a near-side edge of the near-side base extension 93.

The near-side base extension 93 (and first upward base extension 92) are formed with an engaging hole 96 that extends through in the vertical direction as shown in FIG. 2 to FIG. 4. The engaging hole 96 need not necessarily extend through in the vertical direction and may be formed as a recess in the lower surface of the near-side base extension 93.

A plurality of attachment holes 90a are formed in the second upward base extension 94 for allowing bolts to pass through for attaching the chain guide 10 (base member 70) to the attachment target.

Next, how the shoe-side engaging part 41 formed in the flexible extension 40 is engaged with the base-side engaged part 91 formed in the attachment extension 90 will be described below.

The shoe-side engaging part 41 is engaged with the base-side engaged part 91 by sliding the guide shoe 20 on the base member 70 from the near side to the far side in the width direction.

The front-side engaging portion 50 and rear-side engaging portion 60 are engaged with the base member 70 similarly by sliding the guide shoe 20 on the base member 70 from the near side to the far side in the width direction.

More specifically, when the guide shoe 20 is slid toward the far side from the state shown in FIG. 2 to FIG. 4, the upper surface of the near-side shoe extension 43 contacts the attachment extension 90 (lower surface of the near-side base extension 93), whereby the flexible extension 40 is pressed down, as a result of which the flexible extension 40 (upward shoe extension 42) is bent toward the near side.

The upper surface of the near-side shoe extension 43 is inclined downward from the near side to the far side as shown in FIG. 4 so that the flexible extension 40 is prevented from getting caught excessively by the attachment extension 90 and can be bent to allow the guide shoe 20 to be slid smoothly to the far side.

Once the guide shoe 20 is slid to the far side, the flexible extension 40 that was bent toward the near side and downward resiliently returns to its original shape so that part of the flexible extension 40 (near-side shoe extension 43) enters (goes into) the engaging hole 96 of the attachment extension 90.

As described above, in this embodiment, the near-side end of the near-side shoe extension 43, which functions as the shoe-side engaging part 41, is hooked from below to the near-side edge of the engaging hole 96 formed in the near-side base extension 93, which functions as the base-side engaged part 91, so that, during engagement therebetween, the shoe-side engaging part 41 is positioned on the far side of the base-side engaged part 91. Therefore, the movement of the guide shoe 20 toward the near side relative to the base member 70 is restricted.

Since part of the flexible extension 40 is inserted in the engaging hole 96 of the attachment extension 90 when the guide shoe 20 is mounted to the base member 70, the movement of the guide shoe 20 in the front to back direction relative to the base member 70 is also restricted.

Figure 5:
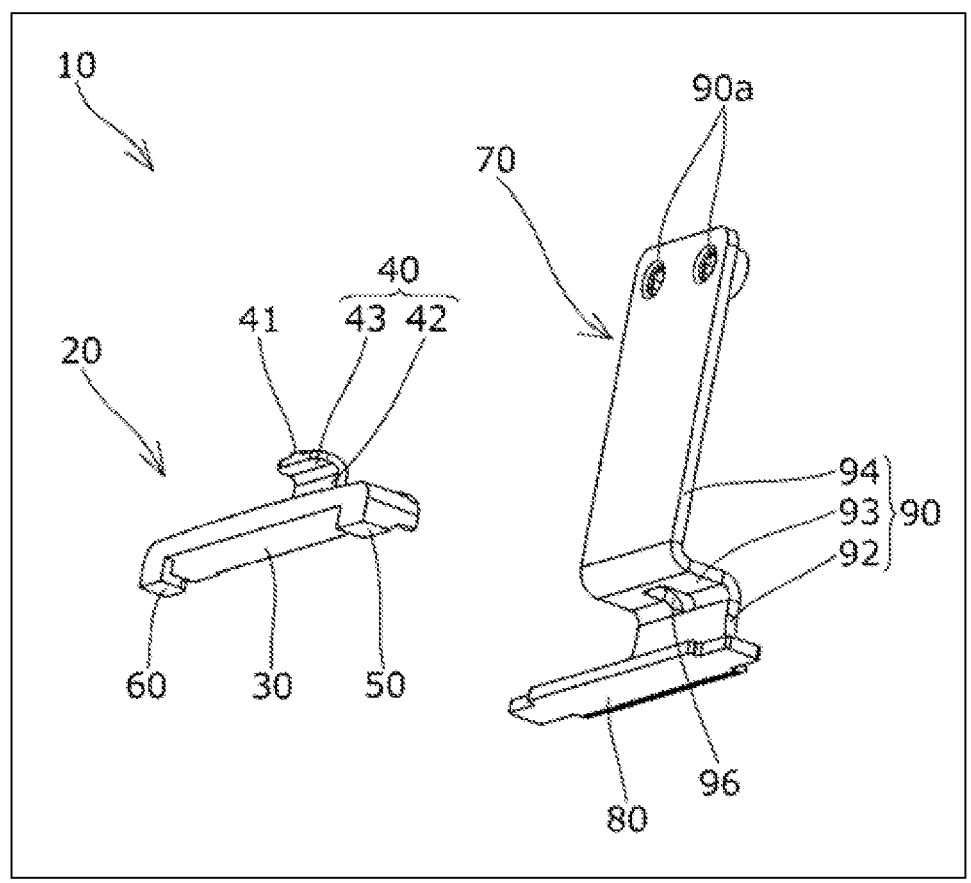
FIG. 5 is a perspective view illustrating a chain guide of a second embodiment before assembly.

Next, a chain guide 10 according to a second embodiment of the present invention will be described with reference to FIG. 5 to FIG. 7. The second embodiment is, in part, exactly the same as the previously described first embodiment, and therefore its configurations will not be described except for the differences.

Figure 6:
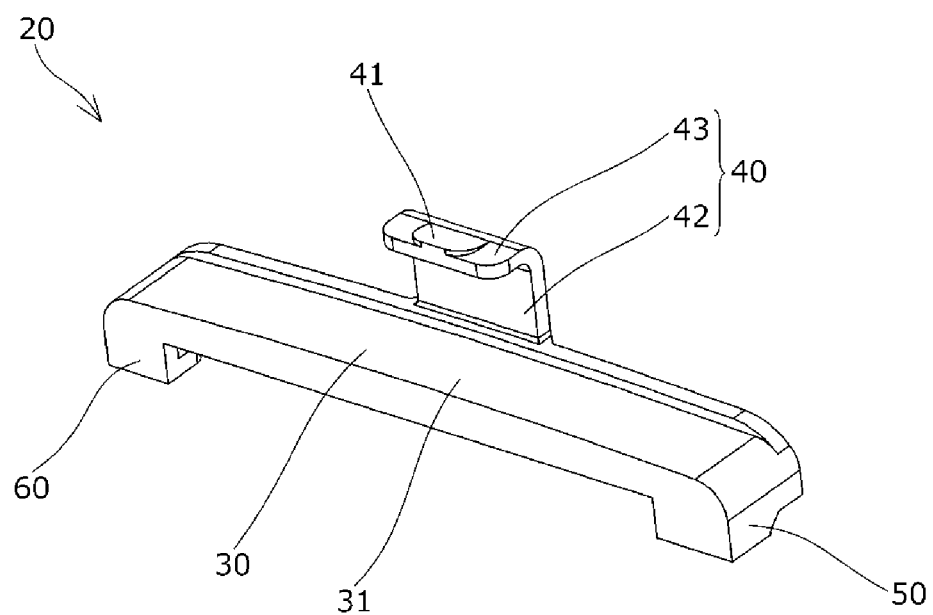
FIG. 6 is a perspective view illustrating a guide shoe of the second embodiment.
Figure 7:
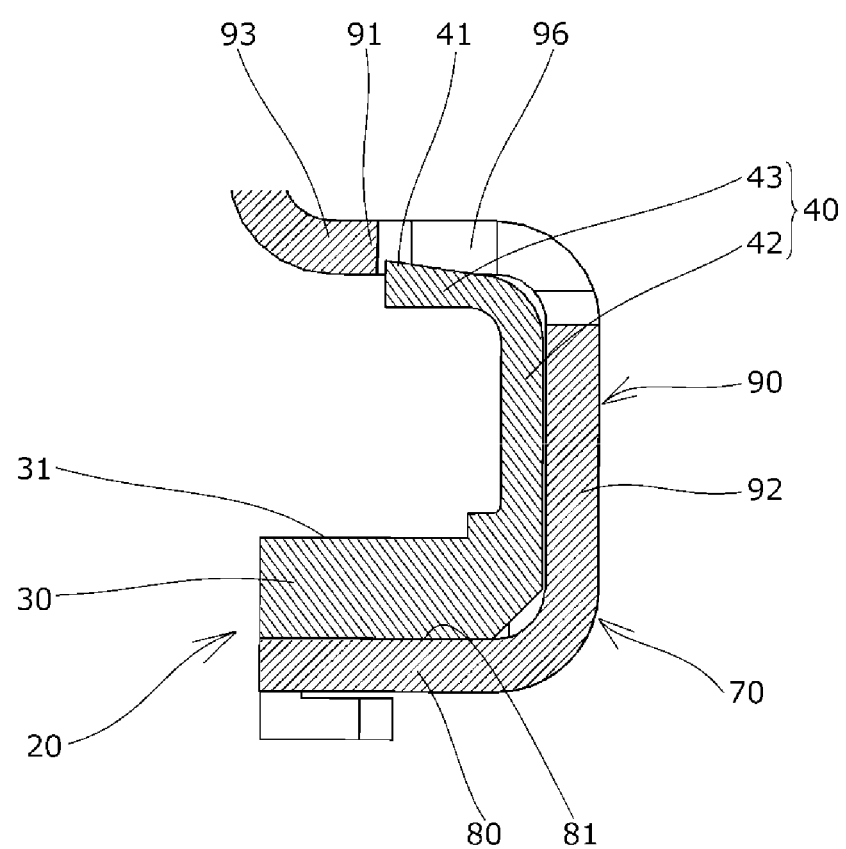
FIG. 7 is a cross-sectional view illustrating the chain guide of the second embodiment after assembly.

In the second embodiment, as shown in FIG. 6 and FIG. 7, a protruded portion formed on the upper surface of the near-side shoe extension 43 functions as the shoe-side engaging part 41.

In the second embodiment, when the guide shoe 20 is mounted to the base member 70, the protruded shoe-side engaging part 41 enters (goes into) the engaging hole 96 of the attachment extension 90 as shown in FIG. 7, whereby the movement of the guide shoe 20 toward the near side relative to the base member 70 is restricted.

In the second embodiment, the protruded upper surface of the shoe-side engaging part 41 is inclined downward from the near side to the far side as shown in FIG. 7 so that the flexible extension 40 is prevented from getting caught excessively by the attachment extension 90 and can be bent.

The upper surface of the near-side shoe extension 43 (other portions than the shoe-side engaging part 41) makes contact with (or faces) the lower surface of the near-side base extension 93 when the guide shoe 20 is mounted to the base member 70, so that the upward movement of the flexible extension 40 relative to the attachment extension 90 can be restricted.

Since the protruded shoe-side engaging part 41 is inserted in the engaging hole 96 of the attachment extension 90 when the guide shoe 20 is mounted to the base member 70, the movement of the guide shoe 20 relative to the base member 70 is restricted also in the front to back direction.

Next, a chain guide 10 according to a third embodiment of the present invention will be described with reference to FIG. 8 and FIG. 9. The third embodiment is, in part, exactly the same as the previously described first embodiment, and therefore its configurations will not be described except for the differences.

Figure 8:
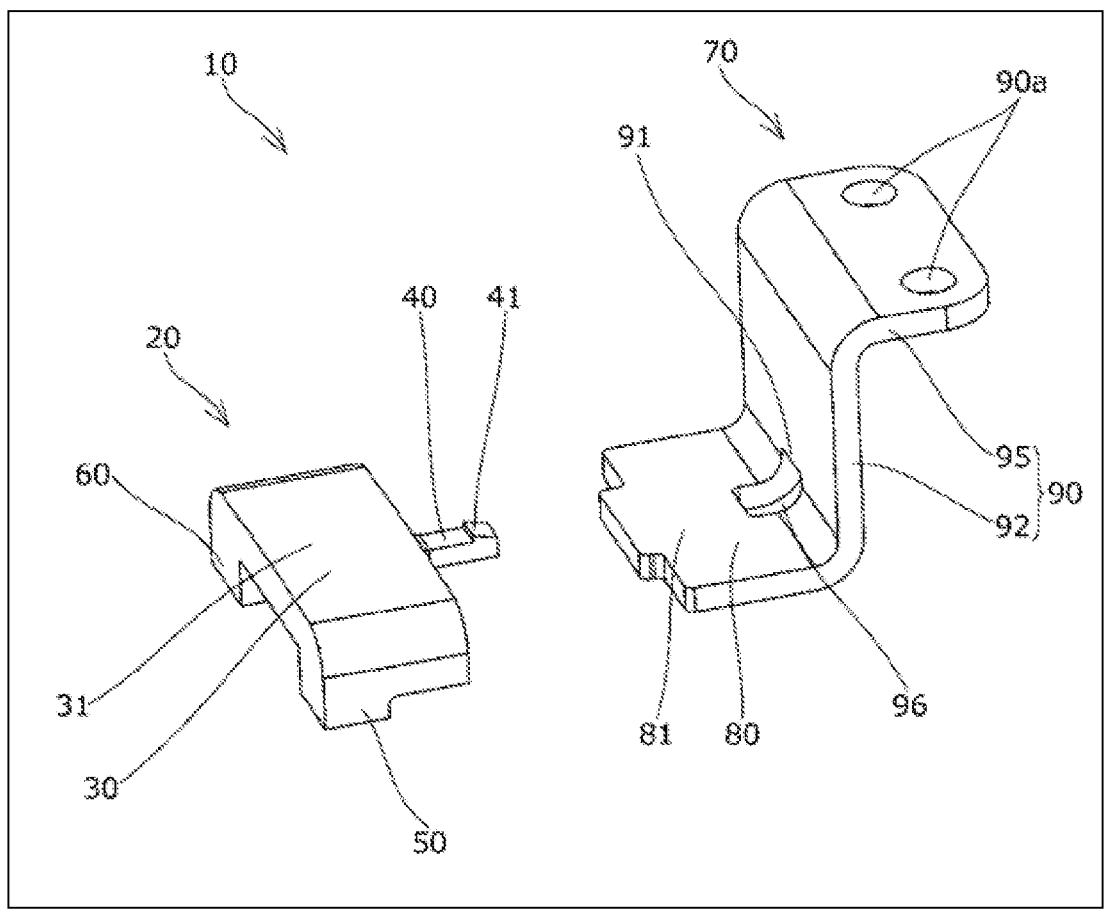
FIG. 8 is a perspective view illustrating a chain guide of a third embodiment before assembly.

In the third embodiment, the flexible extension 40 extends from a far-side edge of the shoe body part 30 to the far side as shown in FIG. 8, and has flexibility so that it can move in the vertical direction.

A shoe-side engaging part 41 in the form of a protrusion protruding upward is formed on the upper surface of the flexible extension 40 as shown in FIG. 8.

Figure 9:
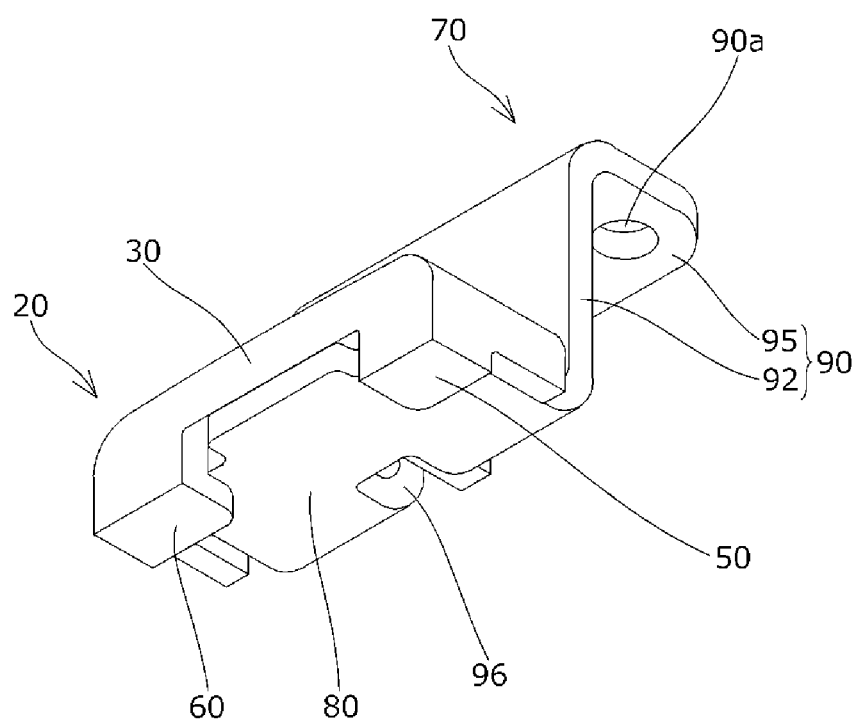
FIG. 9 is a perspective view illustrating the chain guide of the third embodiment after assembly.

In the third embodiment, the attachment extension 90 of the base member 70 includes, as shown in FIG. 8 and FIG. 9, a first upward base extension 92 extending upward from a far-side edge of the base body part 80, and a far-side base extension 95 extending from an upper end of the first upward base extension 92 toward the far side.

The first upward base extension 92 (and base body part 80) are formed with an engaging hole 96 that extends through from the near side to the far side as shown in FIG. 8.

A plurality of attachment holes 90a are formed in the far-side base extension 95.

In the third embodiment, the shoe-side engaging part 41 is hooked from below to an upper edge portion of the engaging hole 96, which functions as the base-side engaged part 91, so that it is positioned on the far side of the base-side engaged part 91 during engagement therebetween.

In the third embodiment, the protruded upper surface of the shoe-side engaging part 41 is inclined downward from the near side to the far side as shown in FIG. 8 so that the flexible extension 40 is prevented from getting caught excessively by the attachment extension 90 and can be bent.

Since the flexible extension 40 is inserted in the engaging hole 96 when the guide shoe 20 is mounted to the base member 70, the movement of the flexible extension 40 relative to the attachment extension 90 is restricted also in the upward and front to back directions.

Next, a chain guide 10 according to a fourth embodiment of the present invention will be described with reference to FIG. 10 and FIG. 11. The fourth embodiment is, in part, exactly the same as the previously described third embodiment, and therefore its configurations will not be described except for the differences.

Figure 10:
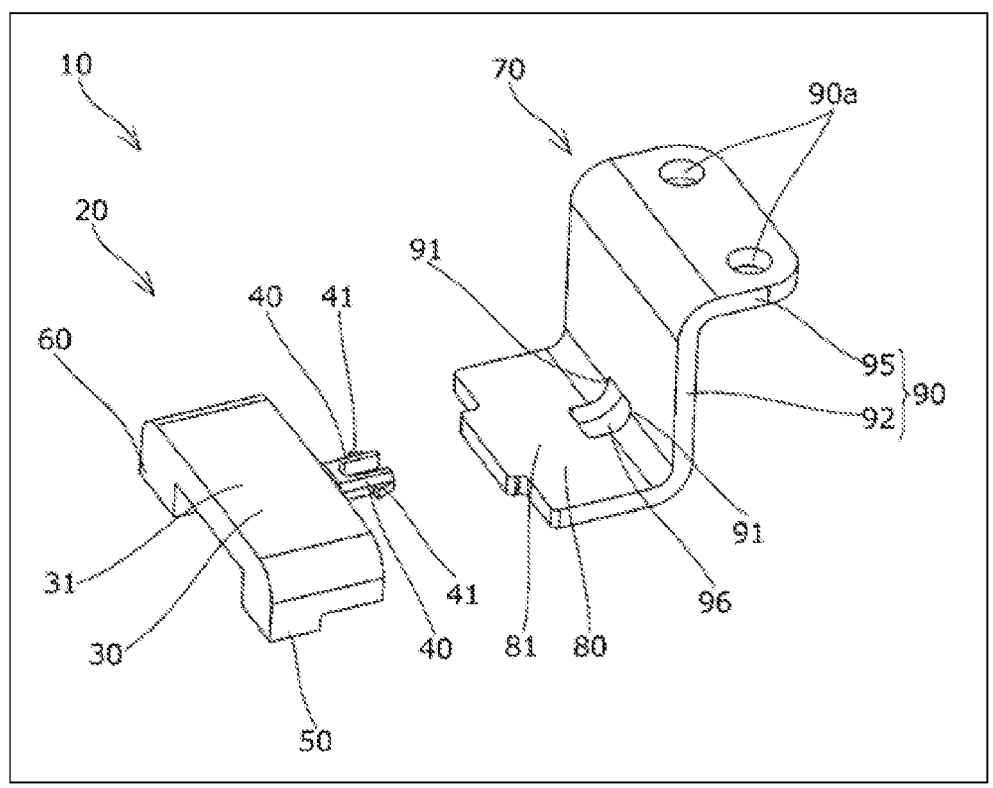
FIG. 10 is a perspective view illustrating a chain guide of a fourth embodiment before assembly.
Figure 11:
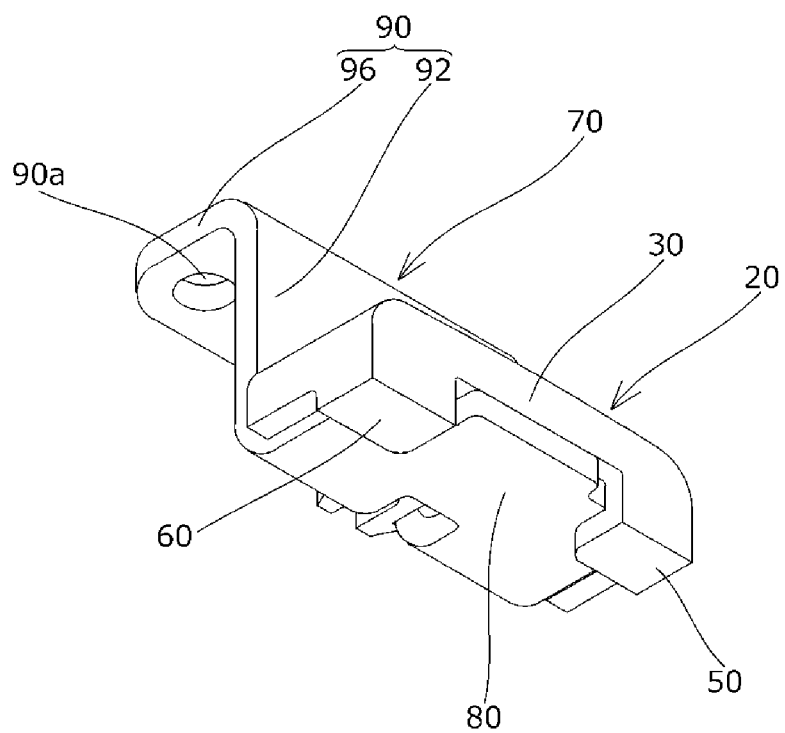
FIG. 11 is a perspective view illustrating the chain guide of the fourth embodiment after assembly.

In the fourth embodiment, two flexible extensions 40 are provided such as to be spaced apart from each other in the front to back direction as shown in FIG. 10. The flexible extensions 40 are each formed to have flexibility and to be movable in the front to back direction.

As shown in FIG. 10, a shoe-side engaging part 41 in the form of a protrusion protruding forward is formed on the front surface of the front-side flexible extension 40, and a shoe-side engaging part 41 in the form of a protrusion protruding rearward is formed on the rear surface of the rear-side flexible extension 40.

In the fourth embodiment, the shoe-side engaging parts 41 are each hooked from front or back to a front or rear edge portion of the engaging hole 96, which functions as the base-side engaged part 91 in this embodiment, so that they are positioned on the far side of the base-side engaged part 91 during engagement therebetween.

Since the flexible extension 40 is inserted in the engaging hole 96 when the guide shoe 20 is mounted to the base member 70, the movement of the flexible extension 40 relative to the attachment extension 90 is restricted also in the upward and front to back directions.

Next, a chain guide 10 according to a fifth embodiment of the present invention will be described with reference to FIG. 12 and FIG. 13. The fifth embodiment is, in part, exactly the same as the previously described third embodiment, and therefore its configurations will not be described except for the differences.

Figure 12:
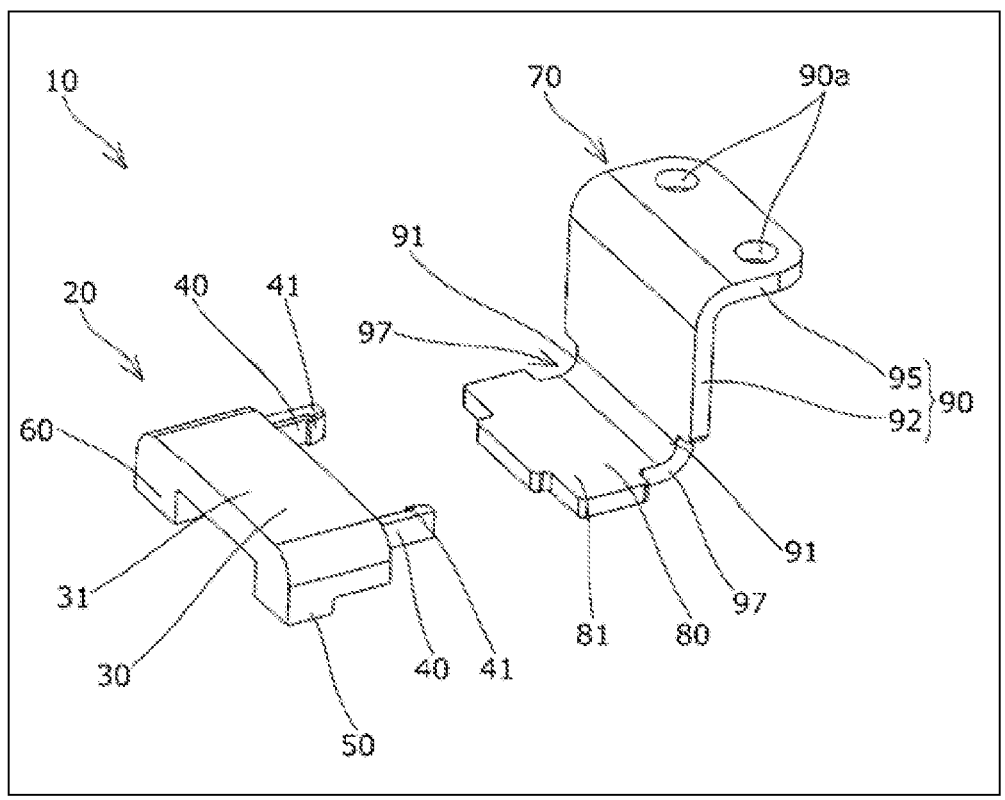
FIG. 12 is a perspective view illustrating a chain guide of a fifth embodiment before assembly.
Figure 13:
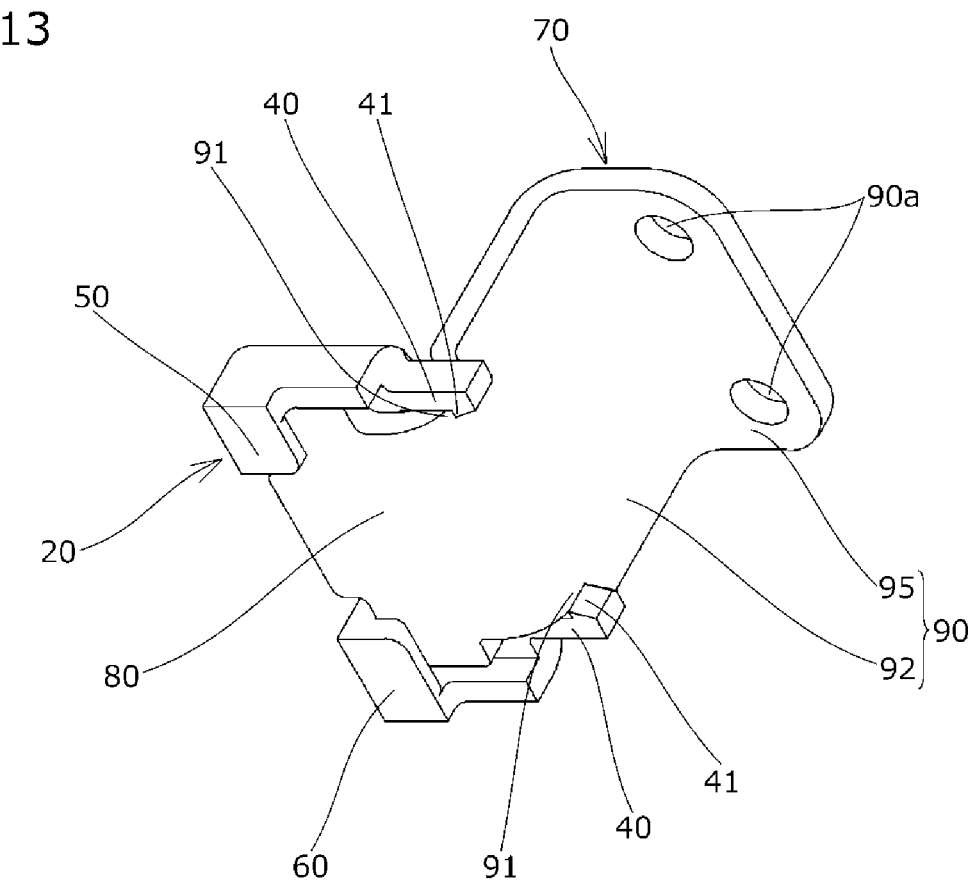
FIG. 13 is a perspective view illustrating the chain guide of the fifth embodiment after assembly.
Figure 14:
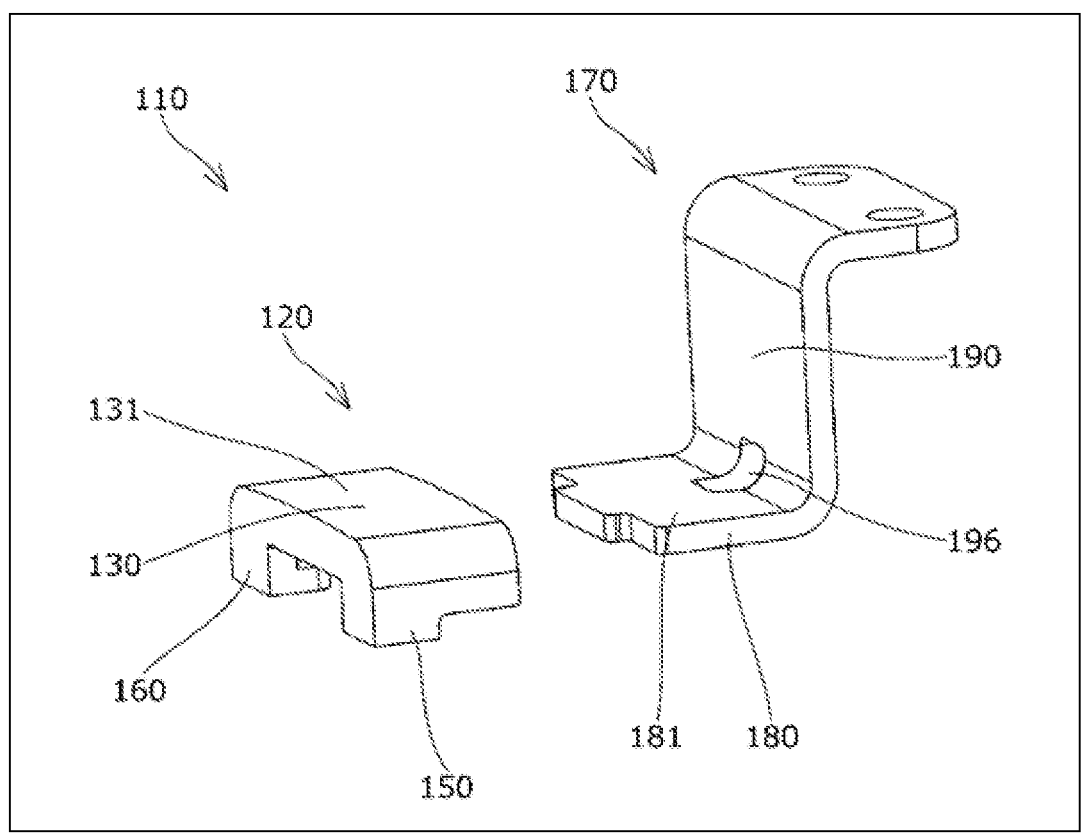
FIG. 14 is a perspective view illustrating a chain guide of a reference example before assembly.
Figure 15:
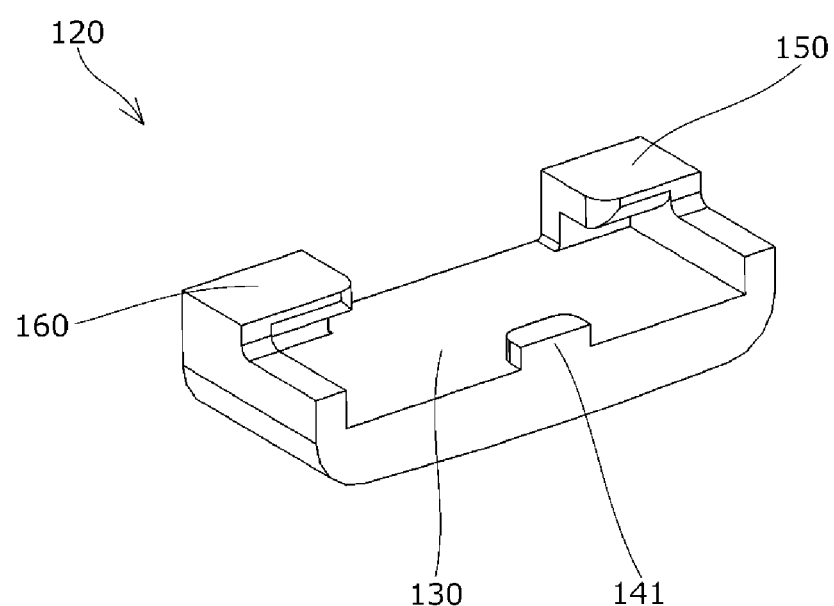
FIG. 15 is a perspective view illustrating a guide shoe of the reference example.

In the fifth embodiment, two flexible extensions 40 are provided such as to be spaced apart from each other in the front to back direction as shown in FIG. 12. The flexible extensions 40 are each formed to have flexibility and to be movable in the front to back direction.

In the fifth embodiment, as shown in FIG. 12, a shoe-side engaging part 41 in the form of a protrusion protruding rearward is formed on the rear surface of the front-side flexible extension 40, and a shoe-side engaging part 41 in the form of a protrusion protruding forward is formed on the front surface of the rear-side flexible extension 40.

In the fifth embodiment, the shoe-side engaging parts 41 are each hooked from front or back to a front-side edge or a rear-side edge portion of the first upward base extension 92, which functions as the base-side engaged part 91 in this embodiment, so that they are positioned on the far side of the base-side engaged part 91 during engagement therebetween.

Since the flexible extensions 40 are positioned inside recesses 97 formed at the front-side edge and rear-side edge portions of the first upward base extension 92 when the guide shoe 20 is mounted to the base member 70, the movement of the flexible extension 40 relative to the attachment extension 90 is restricted also in the upward and front to back directions.

While embodiments of the present invention have been described in detail, the present invention is not limited to the above-described embodiments and may be carried out with various design changes without departing from the scope of the present invention set forth in the claims.

For example, various configurations of the plurality of embodiments described above may be freely combined to form other chain guides.

The material of the guide shoe may be selected from known suitable materials in accordance with various conditions such as resiliency, friction resistance, rigidity, durability, formability, and cost. Synthetic resin materials are particularly suitable.

The material of the base member may be selected from metal materials or synthetic resin materials as appropriate in accordance with various conditions such as rigidity, durability, formability, and cost.

In the embodiments described above, the guide shoe is attached to the base member by being slid on the base member from the near side to the far side in the width direction. The sliding direction of the guide shoe when attaching the guide shoe is not limited to the width direction. For example, the guide shoe may be slid diagonally to the width direction or diagonally to the front to back direction.

In the embodiments described above, the shoe-side engaging part is hooked from below or from front or back to the base-side engaged part so that it is positioned on the far side of the base-side engaged part during engagement therebetween. Instead, the shoe-side engaging part may be configured to be hooked diagonally from below to the base-side engaged part.

In the embodiments described above, the front-side engaging portion is formed at a front end of the shoe body part. The front-side engaging portion may be formed anywhere as long as it is on the front side of the flexible extension. Similarly, the rear-side engaging portion may be formed anywhere as long as it is on the rear side of the flexible extension.

The front-side engaging portion and rear-side engaging portion may have any concrete designs as long as the movement of the guide shoe relative to the base member is restricted in the vertical direction, front to back direction, and toward the near side and far side by the engagement between the base member and the front-side engaging portion, rear-side engaging portion, and flexible extension.

What is claimed is:

1. A chain guide comprising: a guide shoe having a guide surface for slidably guiding a chain along a front to back direction; and
a base member having a support surface for supporting the guide shoe, and an attachment extension for attaching the chain guide to an attachment target,
the guide shoe being mounted to the base member by being slid on the base member from a near side to a far side,
the base member including a base body part having the support surface, the attachment extension extending upward from the base body part beyond the support surface, and a base-side engaged part formed in the attachment extension,
the guide shoe including a shoe body part having the guide surface, a flexible extension extending from the shoe body part, and a shoe-side engaging part formed in the flexible extension and capable of engaging with the base-side engaged part,
the shoe-side engaging part being hooked to the base-side engaged part from below, or diagonally from below, or from front or back, to be positioned on the far side of the base-side engaged part during engagement therebetween,
wherein the guide shoe is configured to be mounted to the base member by being slid on the base member from the near side to the far side in a width direction, and
wherein the flexible extension extends upward from a far-side edge of the shoe body part beyond the guide surface,
the flexible extension has flexibility and is movable toward the near side and the far side,
the attachment extension includes an upward base extension extending upward from a far-side edge of the base body part, and a near-side base extension extending to the near side from an upper end of the upward base extension, and
the base-side engaged part is formed in the near-side base extension.

2. The chain guide according to claim 1, wherein the flexible extension includes an upward shoe extension extending upward from the far-side edge of the shoe body part, and a near-side shoe extension extending to the near side from an upper edge of the upward shoe extension, and
the shoe-side engaging part is formed in the near-side shoe extension.

3. The chain guide according to claim 1, wherein the near-side base extension is formed with an engaging hole that extends through in a vertical direction,
the shoe-side engaging part is inserted in the engaging hole, and
a near-side edge portion of the engaging hole functions as the base-side engaged part.

4. The chain guide according to claim 1, wherein the guide shoe includes a front-side engaging portion formed on a front side of the flexible extension and engaging with the base member, and a rear-side engaging portion formed on a rear side of the flexible extension and engaging with the base member, and
the front-side engaging portion and the rear-side engaging portion are configured to engage with the base member by sliding of the guide shoe on the base member from the near side to the far side.

\* \* \* \* \*